United States Patent
Baynes et al.

(10) Patent No.: US 8,366,526 B2
(45) Date of Patent: Feb. 5, 2013

(54) POWER PLAY GAME MECHANICS

(75) Inventors: Nick Baynes, Brighton (GB); David Jefferies, Hove (GB); Jason Green, Brighton (GB); Serkan Hassan, Brighton (GB)

(73) Assignee: Disney Enterprises, Inc., Burbank, CA (US)

( * ) Notice: Subject to any disclaimer, the term of this patent is extended or adjusted under 35 U.S.C. 154(b) by 120 days.

(21) Appl. No.: 12/761,888

(22) Filed: Apr. 16, 2010

(65) Prior Publication Data
US 2011/0256912 A1 Oct. 20, 2011

(51) Int. Cl.
*A63F 9/24* (2006.01)
(52) U.S. Cl. ............................................. 463/6; 463/43
(58) Field of Classification Search ................ 463/6, 43, 463/20–40; 273/178
See application file for complete search history.

(56) References Cited

U.S. PATENT DOCUMENTS

| | | | |
|---|---|---|---|
| 2002/0024521 A1* | 2/2002 | Goden | 345/474 |
| 2002/0115486 A1* | 8/2002 | Miyamoto et al. | 463/32 |
| 2004/0224740 A1* | 11/2004 | Ball et al. | 463/6 |
| 2004/0266526 A1* | 12/2004 | Herbrich et al. | 463/33 |
| 2007/0066403 A1* | 3/2007 | Conkwright | 463/43 |
| 2007/0298856 A1* | 12/2007 | Gilmore et al. | 463/16 |
| 2010/0203933 A1* | 8/2010 | Eyzaguirre et al. | 463/2 |
| 2010/0211431 A1* | 8/2010 | Lutnick et al. | 705/10 |

OTHER PUBLICATIONS

NPL Wekepedia Rough Racer, Released date 1990.*
NPL Wekepedia Super off Road, released on 1989.*
NPL Wekepedia Super sprint , released on 1986.*
NPL Smash Cars review , dated Aug. 20, 2009.*
NPL Bournout Paradise review , dated Jan. 22, 2008.*

* cited by examiner

*Primary Examiner* — Masud Ahmed
(74) *Attorney, Agent, or Firm* — Patterson & Sheridan, LLP

(57) ABSTRACT

Method, article and apparatus for executing computer games, and in particular, computer-based racing games. In a racing game, a player may be allowed to earn one or more game play options which may be exercised during the race. The game play options, when exercised, may modify the predefined race path to create an advantage for the player or a disadvantage to the competitors.

20 Claims, 13 Drawing Sheets

POWER PLAY GAME MECHANICS

BACKGROUND

1. Field

The invention is directed to computer games, and in particular, to computer-based racing games.

2. Description of the Related Art

Racing games are a popular genre in the computer gaming world. These games typically include one or more players that race on a predefined track. The players either race against a clock (e.g., in the case of a single player race) or against each other (e.g. in the case of a multiplayer race). The players are represented by a virtual vehicle which they control using an input device, such as a steering wheel or joystick-type controller. Each player is typically presented (via the game screen) with a plurality of on-screen graphical objects or text that provide various kinds of information relevant to the race. For example, the game screen may include a speedometer, a leader board, a lap counter, a map etc. In a multiplayer race, the player that travels the predefined track in the shortest period of time generally wins the race.

SUMMARY

One embodiment of the invention provides a computer implemented method for executing a vehicle racing video game. The method may include generating an indication to a player of the video game that a game play option is available, the game play option being selectable by the player to cause a modification in a predefined path traversable by vehicles participating in the video game. The modification may be selected from at least one of: a permanent structural change to the predefined path and a route change to the predefined path that alters where at least one of the vehicles is able to traverse. The method may further include receiving user input indicating that the the game play option is to be exercised, and in response to receiving the input, modifying the predefined path of the race.

Another embodiment of the invention provides a computer readable storage medium comprising a program product which, when executed, is configured to perform an operation to execute a vehicle racing video game. The operation may include generating an indication to a player of the video game that a game play option is available, the game play option being selectable by the player to cause a modification in a predefined path traversed by vehicles participating in the video game. The modification may be selected from at least one of: a permanent structural change to the predefined path and a route change to the predefined path that alters where at least one of the vehicles is able to traverse. The operation may further include receiving user input indicating that the the game play option is to be exercised and in response to receiving the input, modifying the predefined path of the race.

Another embodiment of the invention provides a system having a memory device comprising a vehicle racing video game and a processor for executing the vehicle racing video game. The processor may be configured to generate an indication to a player of the video game that a game play option is available, the game play option being selectable by the player to cause a modification in a predefined path traversed by vehicles participating in the video game. The modification may be selected from at least one of: a permanent structural change to the predefined path and a route change to the predefined path that alters where at least one of the vehicles is able to traverse. The processor may be further configured to receive user input indicating that the the game play option is to be exercised and in response to receiving the input, modify the predefined path of the race.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
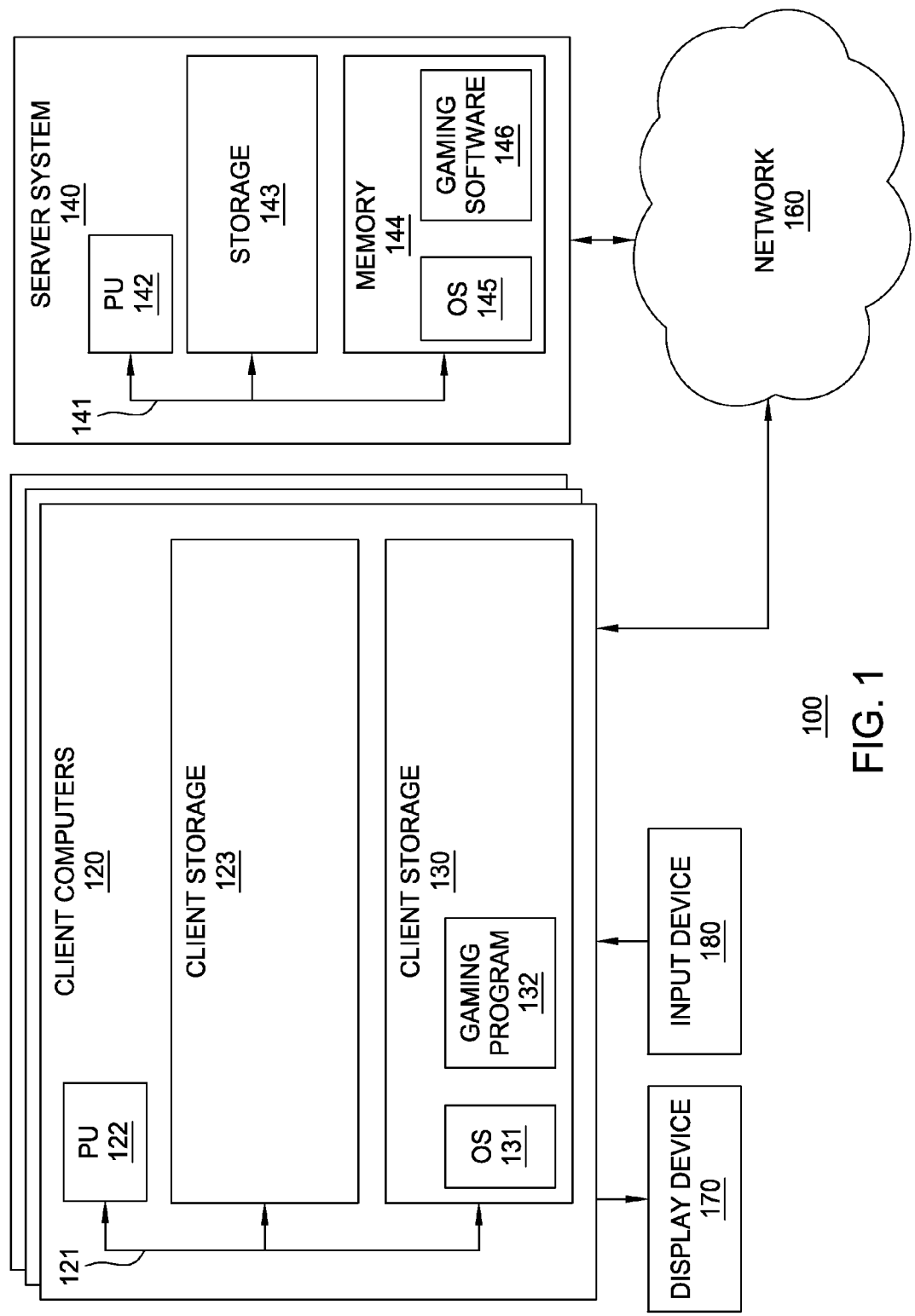
FIG. 1 illustrates an exemplary system according to an embodiment of the invention.

Embodiments of the present invention are directed to computer games, and in particular to computer-based racing games. In a racing game, a player may be allowed to earn one or more game play options (also referred to herein as power play options) which may be exercised during the race. The power play options, when exercised, may modify the predefined race path to create an advantage for the player or a disadvantage to the competitors.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, a block diagram illustrates a client-server view of a computing environment 100, according to one embodiment of the invention. As shown, computing environment 100 includes client computers 120, a network 160, and a server system 140. In one embodiment, the environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented differently, regardless of whether the computer systems are complex multi-user computing systems, such as a cluster of individual computers connected by a high-speed network, single-user workstations, or network appliances lacking non-volatile storage. Further, while FIG. 1 illustrates a client-server model, other models are contemplated such as a peer-to-peer model.

As shown, each client computer 120 includes a processing unit 122, which obtains instructions and data via a bus 121 from a client memory 130 and client storage 123. Processing unit 122 is a programmable logic device that performs instruction, logic, and mathematical processing, and may be representative of one or more CPUs and/or GPUs. Client storage 123 stores application programs and data for use by client computer 120.

The memory 130 is any memory sufficiently large to hold the necessary programs and data structures. Memory 130 could be one or a combination of memory devices, including Random Access Memory, nonvolatile or backup memory (e.g., programmable or Flash memories, read-only memories, etc.). In addition, memory 130 and storage 123 may be considered to include memory physically located elsewhere; for example, on another computer coupled to the client computer 120 via bus 121.

Client storage 123 includes hard-disk drives, flash memory devices, optical media and the like. Client computer 120 is operably connected to the network 160. Client memory 130 includes an operating system (OS) 131 and a gaming program 132. Operating system 131 is the software used for managing the operation of the client computer 120. Examples of OS 131 include UNIX, a version of the Microsoft Windows® operating system, and distributions of the Linux® operating system. (Note: Linux is a trademark of Linus Torvalds in the United States and other countries.)

In one embodiment, each client is a dedicated gaming console, such as a Sony PS3®, Nintendo Wii®, or Xbox 360®, capable of executing the gaming program 132. In another embodiment, each client is a general purpose computer configured to run any variety of gaming and non-gaming software. The game may be viewed on a display device 170, such as an LCD, LED or CRT monitor display, and controlled using input devices 180 which may be, e.g., a keyboard, mouse and/or a controller.

As shown, the server system 140 includes the same basic hardware elements as the client computers 120. Specifically, the server system 140 includes a processing unit 142 (representative of one or more CPUs and/or GPUs), a memory 144 and storage 143 connected via a bus 141. The server system 140 may be operably connected to the network 160, which generally represents any kind of data communications network. Accordingly, the network 160 may represent both local and wide area networks, including the Internet. In one embodiment, the server system 140 hosts an on-line gaming environment to which one or more of the client computers 120 connect. In this case, server-side gaming software 146 may be located in memory 144 of the server system 140 and cooperates with client-side gaming software (e.g., game program 132) located on the respective client computers 120.

It is specifically contemplated that embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a game program) or related data available in the cloud. For example, the racing game described herein could execute on a computing system in the cloud, thereby allowing a user to access the game from any computing system attached to a network connected to the cloud (e.g., the Internet).

The following embodiments of the invention are described with reference to a vehicle racing game in which a plurality of game characters (also referred to herein as players) compete to win a race along a predefined path. The game characters may be user controlled and/or computer controlled. In one embodiment, the game software (e.g., game program 132), wherever located, is a racing game which allows one or more or players to control a vehicle using a controller. The winner of the racing game may be determined based on the relative completion times of each of the players travelling the predefined path.

Figure 2:
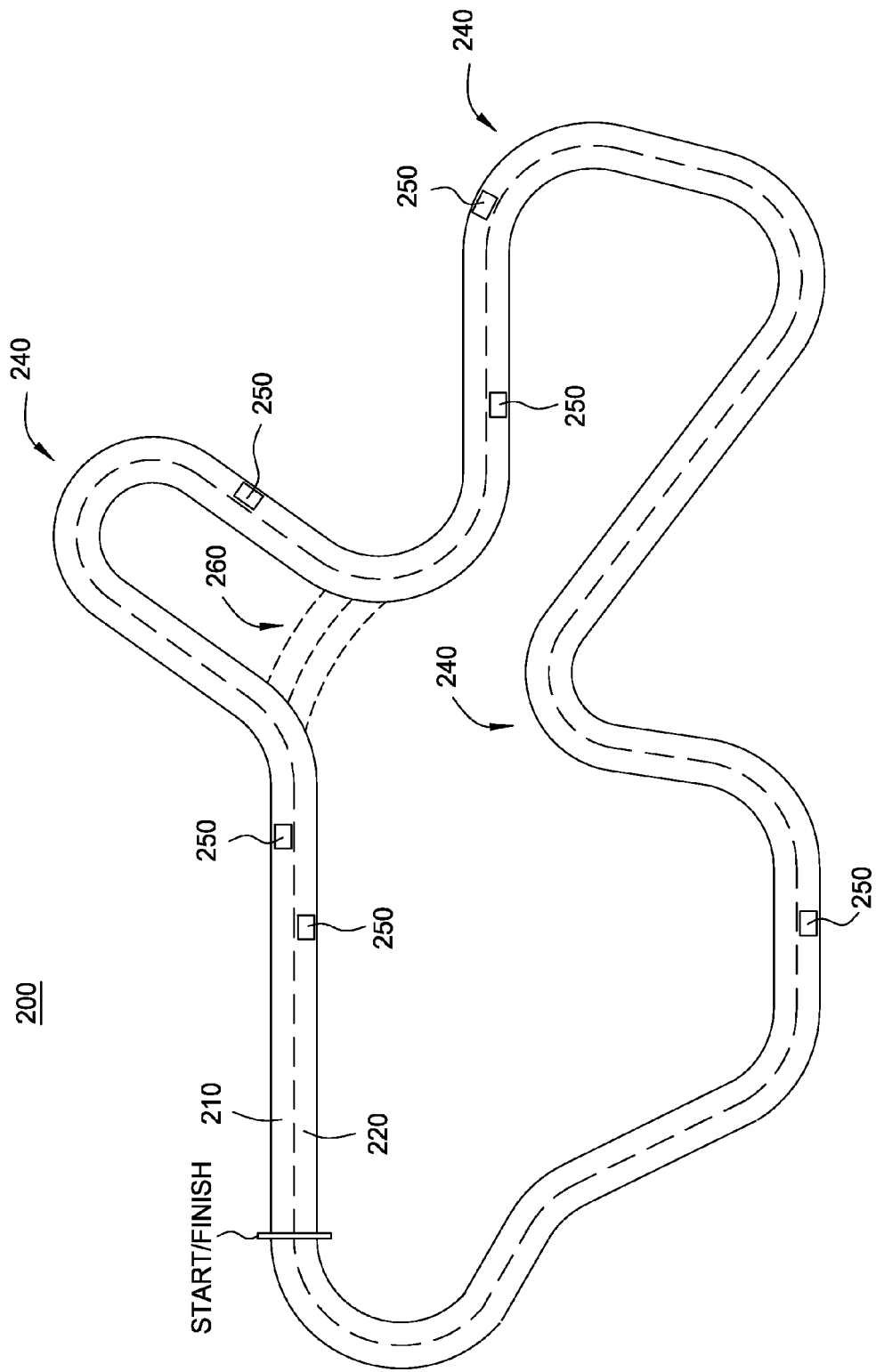
FIG. 2 illustrates an exemplary predefined race path according to an embodiment of the invention.

FIG. 2 illustrates an exemplary predefined path 200 according to an embodiment of the invention. As illustrated in FIG. 2, the predefined path 200 may include one or more travelling lanes. While only two travelling lanes 210 and 220 are shown in FIG. 2, in alternative embodiments, the path 200 may include any number of lanes. The plurality of lanes of the path 200 may be arranged as two-way lanes or one-way lanes. In one embodiment, the path 200 may be a circuit. In other words, a start position 230 of the path may be the same as the finish position 230. However, in alternative embodiments, the start position and the finish position may be at different locations.

In one embodiment, the path 200 may include a plurality of path features that may require a player to maneuver a vehicle along or around the features while navigating the path. For example, the path 200 in FIG. 2 includes a plurality of curves 240. In some embodiments, a plurality of obstacles 250 may be placed in the lanes 210 and 220, as illustrated in FIG. 2. The obstacles 250 may include static obstacles such as traffic cones, parked vehicles, pot holes, road bumps, and the like. The obstacles may also include moving objects such as pedestrians, slow moving traffic, oncoming traffic, and the like.

A player may have to quickly and efficiently maneuver a vehicle along the features 240 and around obstacles 250 to improve his/her chances of winning the game. Crashing into an obstacle 250 or skidding off the lanes 210 and 220 while navigating a curve 240, may stop or significantly slow down the player's vehicle, thereby allowing other players to gain an advantage. In one embodiment, the path 200 may include one or more hidden shortcuts 260 that may be made available by exercising a power play, as will be discussed in greater detail below.

Figure 3A:
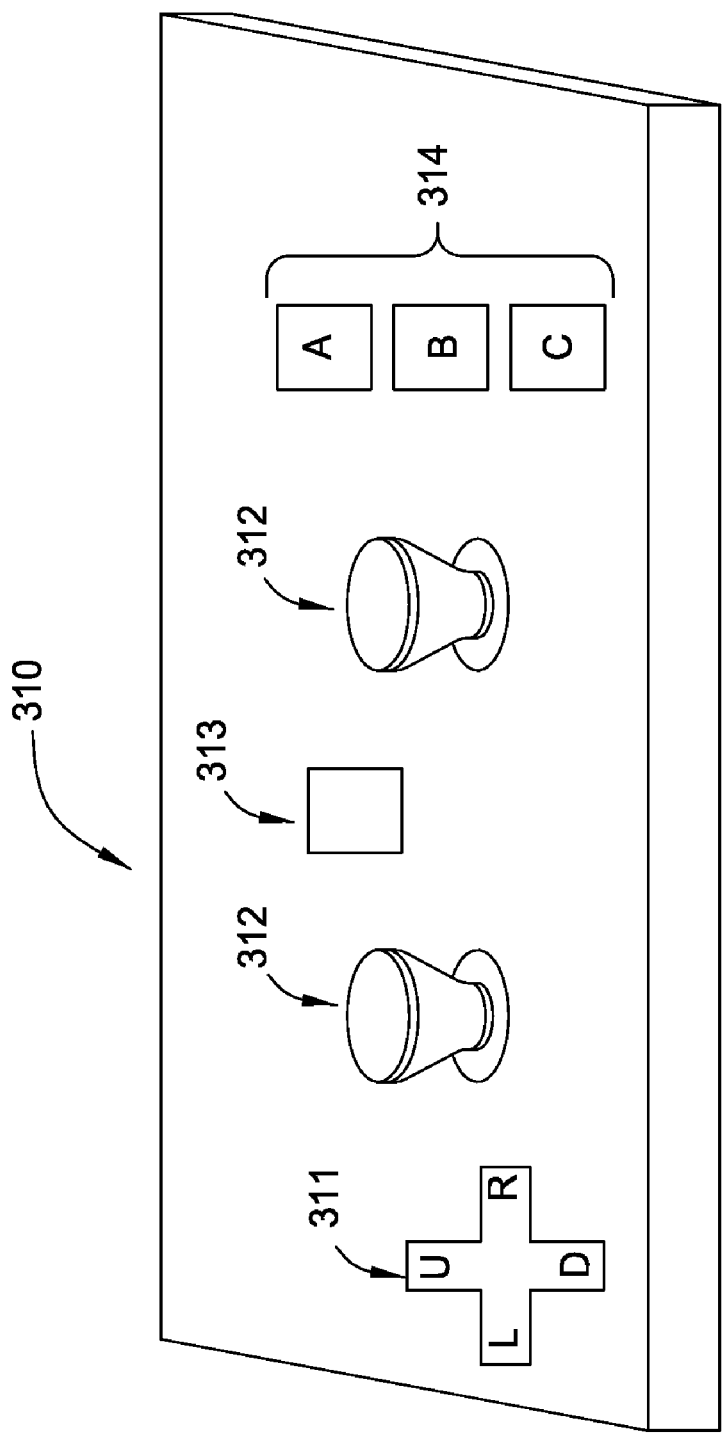
FIGS. 3A-B illustrate exemplary gaming controllers according to embodiments of the invention.

Maneuvering a vehicle may involve using a game controller to control the movement of the vehicle while playing the racing game. FIG. 3A illustrates an exemplary controller 310 according to an embodiment of the invention. The controller 310 is shown as a rectangular device in FIG. 3A. However, in alternative embodiments, the controller 310 may have any reasonable shape. For example, in some embodiments, the controller may be ergonomically shaped to facilitate gripping with human hands. The controller 310 may be a wired or a wireless controller configured to connect with a client computer 120.

In general, the controller 310 may include one or more buttons, joysticks, switches, trackballs, and the like. For example, as illustrated in FIG. 3A, the controller 310 may include a direction pad 311, one or more joysticks 312, start button 313, and one or more functional buttons 314. The start button 313 may be configured to power the controller 310. If the controller 310 is a wireless controller, pressing the start button 313 may cause the controller to establish a wireless connection with a respective client computer 120.

The direction pad 311 may include a plurality directional buttons, e.g., up/forward (U), down/back (D), left (L), and right (R), as illustrated in FIG. 3A. In one embodiment, the direction pad 311 may be used to maneuver a vehicle in a racing game. For example, the forward button (U) may be used to accelerate a vehicle, the back button (D) may be used for braking, and the left (L) and right (R) buttons may be used to turn the vehicle in a desired direction. In one embodiment, a joystick 312 may also be used to maneuver a vehicle in a racing game. For example, a player may simply push a joystick in a direction in which movement of a vehicle is desired.

The functional buttons 314 may be used by players to exercise one or more specialized options. For example, in one embodiment, pressing a functional button 314 may allow a player to exercise a boost option that allows the player's vehicle to travel at greater than normal speeds for a predefined period of time. In some embodiments, a player's vehicle may be equipped with one or more guns. Accordingly, in such embodiments, a functional button 314 may be pressed to shoot at or blow up an opponent's vehicle, thereby giving the player an advantage in the game. In one embodiment, the functional buttons (or a combination thereof) may be used to exercise a power play option, as is described in greater detail below.

Figure 3B:
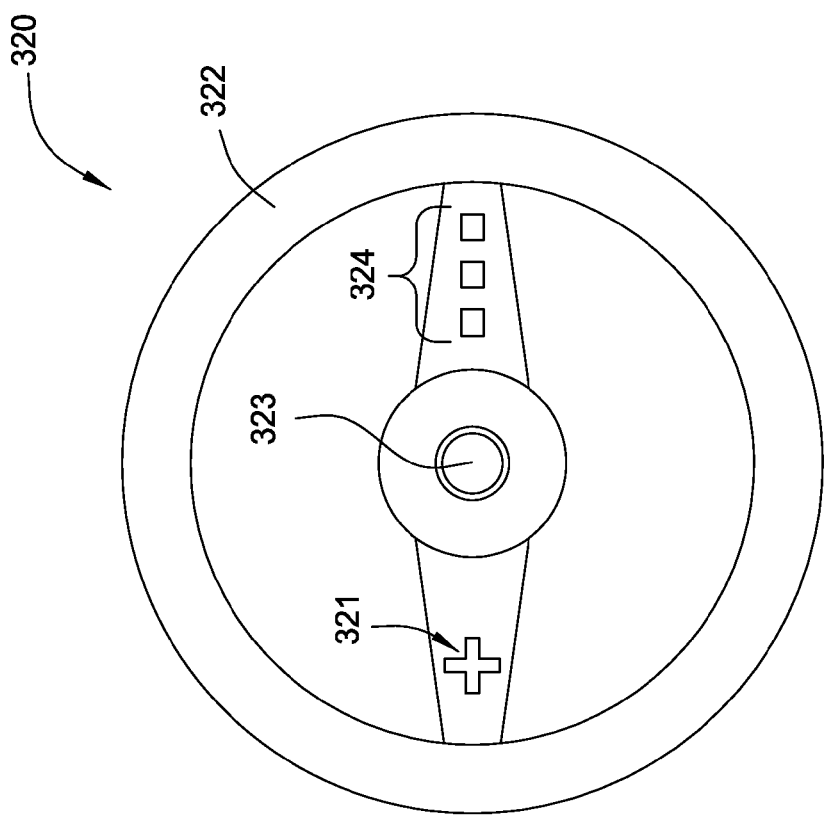

FIG. 3B illustrates another exemplary controller 320, according to an embodiment of the invention. As illustrated in FIG. 3B, the controller 320 may be a shaped like a steering wheel. The controller 320 may include a direction pad 321, start button 323, and functional buttons 324, which are similar to the direction pad 311, start button 313, and functional buttons 314 of FIG. 3A. Because the controller is shaped like a steering wheel, a player may be allowed to maneuver a vehicle in the game by simply turning the wheel 322 in the same way the player would while driving an actual vehicle.

The controllers 310 and 320 are shown in FIGS. 3A-B for illustrative purposes only and are not limiting on the invention. Any reasonable type and shape of controller, for example, key pads, key boards, mouse, trackballs, and the like may be used in alternative embodiments to play the racing game, as disclosed herein. In some embodiments, the racing game may be played in a controller-free environment. In such embodiments, the gaming system, e.g., client 120, may be configured to detect gestures of one or more players, wherein the gestures may be used to maneuver vehicles in the racing game.

Figure 4:
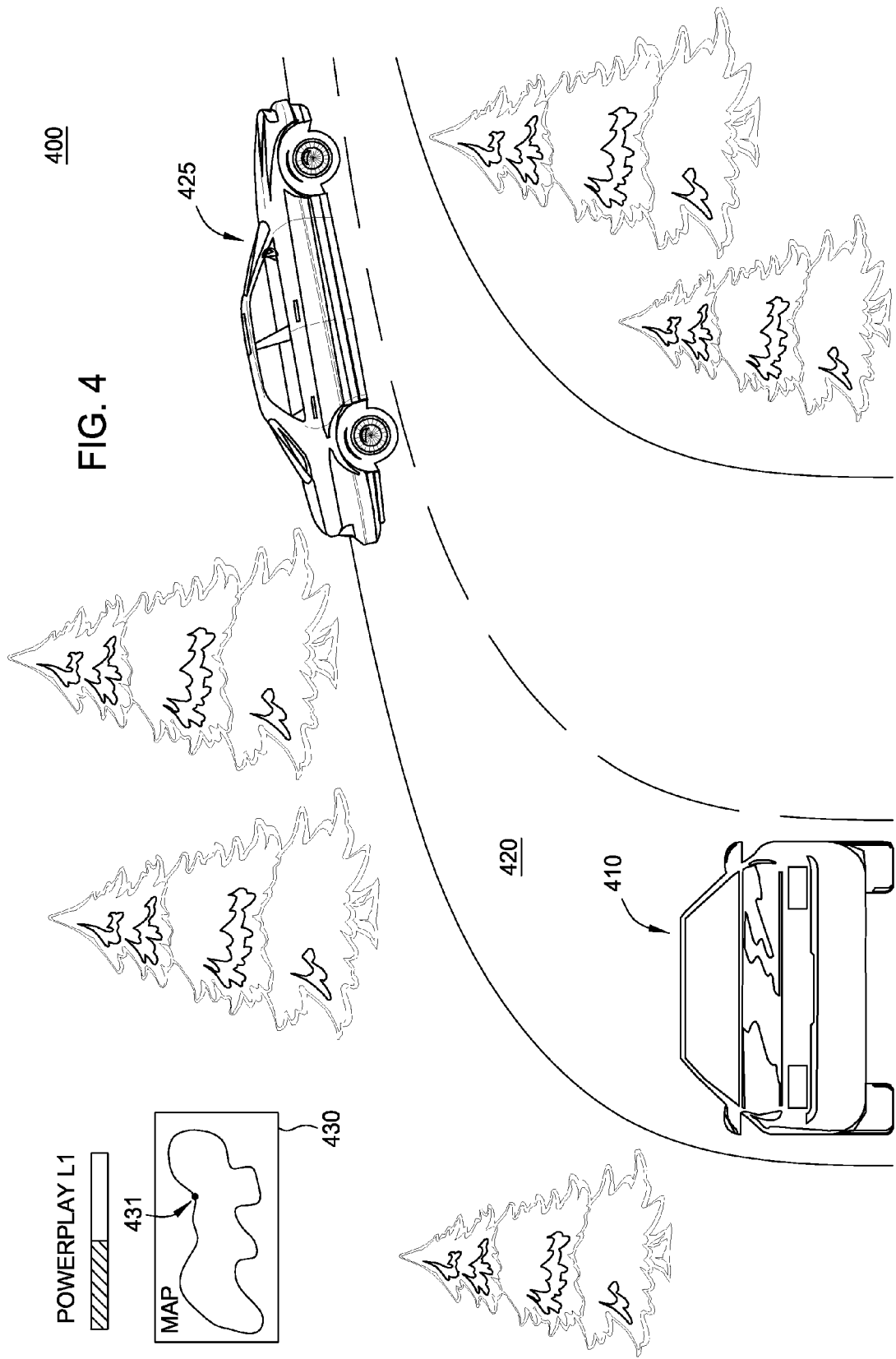
FIG. 4 illustrates an exemplary view that may be displayed on a display screen, according to an embodiment of the invention.

FIG. 4 illustrates a view 400 of a racing game that may be displayed on a display device 170 according to an embodiment of the invention. The view 400 of the racing game may be displayed while executing a gaming program, e.g., gaming program 132 and 146 illustrated in FIG. 1. As illustrated in FIG. 4, a player's vehicle 410 (a car in FIG. 4) may be displayed in a bottom-center portion of the view 400. A portion of a path 420 being traversed by the vehicle 410 is also visible in the view 400. In one embodiment, the portion of the path 420 may correspond to a portion of the path 200 illustrated in FIG. 2. Also illustrated in the view 400, is an environment around the path. For example, an environment comprising trees and a mountain is shown around the path 420 in FIG. 4.

During the car racing game, the vehicle 420 is presumed to be moving into the plane of the page. As a player accelerates and/or turns the vehicle 410 with a controller, path 420 and the environment around the path may be modified to simulate motion of the vehicle. As the player maneuvers his/her vehicle, one or more objects may become visible. For example, one of more competitors' vehicles 425 or obstacles, e.g., the obstacles 250 of FIG. 2, may appear in the view 400.

The view 400 also includes a map 430 of the path 420, in one embodiment. The map 430 may indicate the shape of the path and a present location 431 of the player on the path. In one embodiment, the map 430 may also indicate locations of competitors on the path. Using the map 430, a player may be able to make decisions on appropriate drive speed, gear-level, and the like, to successfully navigate his/her vehicle along or around path features such as curves, other players' vehicles, and the like.

In one embodiment, the racing game 132 may allow players to earn and exercise one or more power play options to gain an advantage in the game. In general, exercising a power play option may modify the predefined path of the game in such a way as to create an advantage for the player. A player may earn power play options by any one or more predefined methods. For example, in one embodiment, each player of the racing game may earn points for successfully navigating the predefined path of the game. E.g., predefined points may be assigned for navigating particular curves without going off course, navigating around obstacles without crashing, and the like. When a player accumulates a pre-set amount of points, a power play option may become available to the player.

While accumulating points to earn power play options are disclosed herein, any other reasonable methods, or combination of methods for earning power play options may be implemented. For example, in some embodiments, players may be allowed to collect power play options by driving his/her vehicle through or over power play objects that may be placed along the predefined path. In some embodiments, the power play objects may be placed at positions on the path that are difficult to navigate, e.g., on inside lanes of a sharply curved path.

In one embodiment, of the invention, the view 400 may provide an indication of how close a player is to earning a power play option. For example, a status bar or power bar 440 may be provided, as illustrated in FIG. 4. As a player gains points, the color of the power bar may change from a first color 441 to a second color 442 in a predefined direction. When the power bar completely changes to the second color, the power play may become available to the player. Alternatively, in some embodiments, an icon, a message, or any other reasonable graphical indication may be used to indicate to the player that a power play option is available to the player.

In general, exercising the power play option causes a modification to the predefined path. For example, a modification may be a structural change to the path itself. The structural change may or may not be permanent. Examples of permanent structural change include the introduction of a pothole or boulder to the path. Non-permanent structural changes include introducing or removing movable objects (such as a traffic cone) onto/from the path. Permanent structural changes are not removed from the path by interaction with the vehicles and, therefore, are experienced by all the players encountering the structural change. Non-permanent structural changes, on the other hand, may not be experienced by all the players because the object which introduced the structural change may be moved by one or more of the vehicles impacting the object. Another form of modification may be a route change where the route available to one or more of the vehicles is altered, such as where a previously available path segment is closed (i.e., rendered unnavigable) or a new path segment is opened.

It should be appreciated that the modifications described herein may be pre-scripted, according to some embodiments. Pre-scripted modifications are not subject to physics rules and are programmed to occur in precisely the same way each time they are invoked. For example, various power play options may be available at specific, predefined locations on a track and, when exercised, produce precisely the same event each time (such as a boulder rolling onto the track). In another embodiment, the modifications are subject to physics rules, in which case the manner in which those modifications occur will depend on the state of game.

Figure 5A:
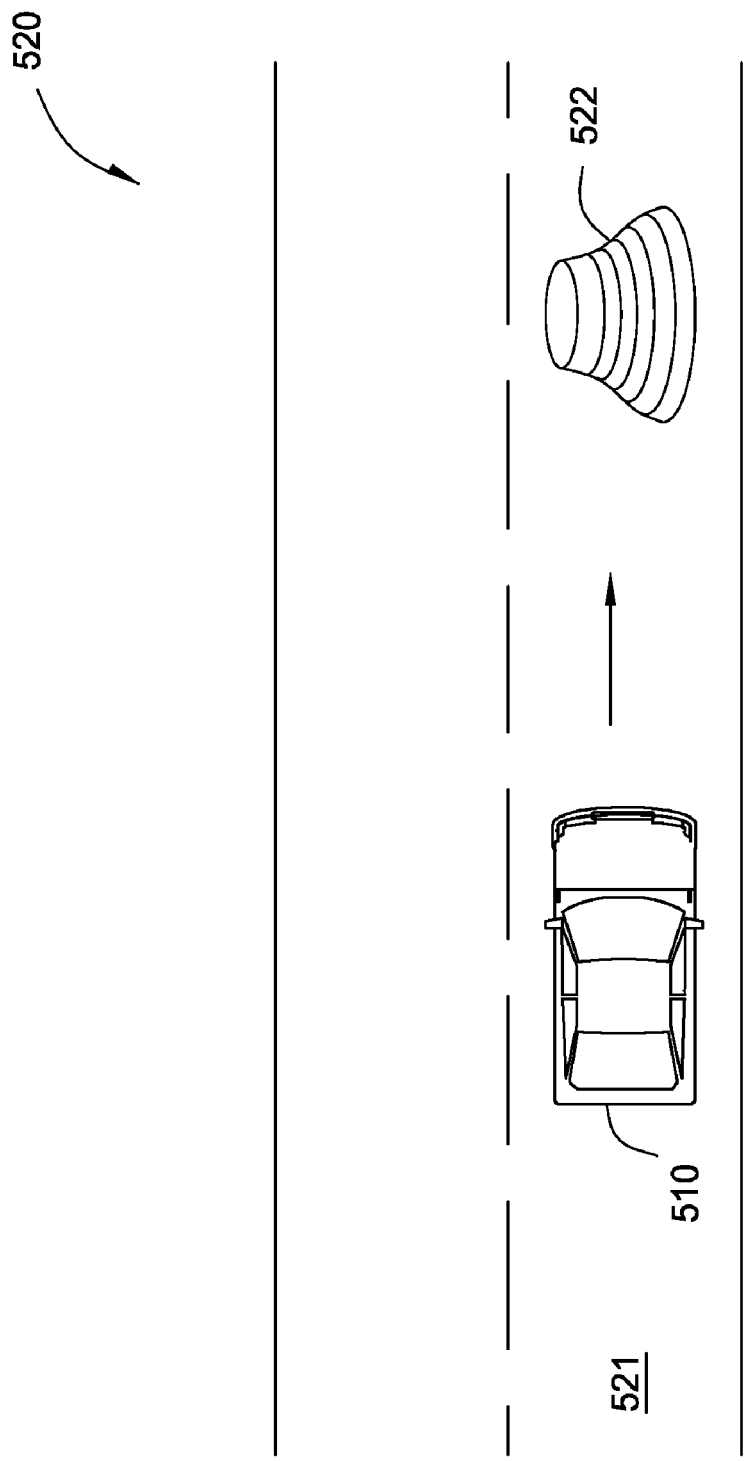
FIGS. 5A-B illustrate a power play according to an embodiment of the invention.

In one embodiment, exercising the power play option may make it easier for the player to traverse the predefined path. For example, exercising the power play may clear one or more obstacles in the player's path. FIG. 5 illustrates an example of exercising a power play option according to an embodiment of the invention. As illustrated in FIG. 5A, the player's vehicle 510 may be travelling at a high rate of speed in a first lane 521 of a straight portion of predefined path 520. As shown in FIG. 5A, an obstacle, e.g., a traffic cone 522 may be present in the lane 521. Maneuvering around the traffic cone 522 may slow the players' progress. Accordingly, in one embodiment, exercising a power play option may result in an obstacle being removed from the players' path.

Figure 5B:
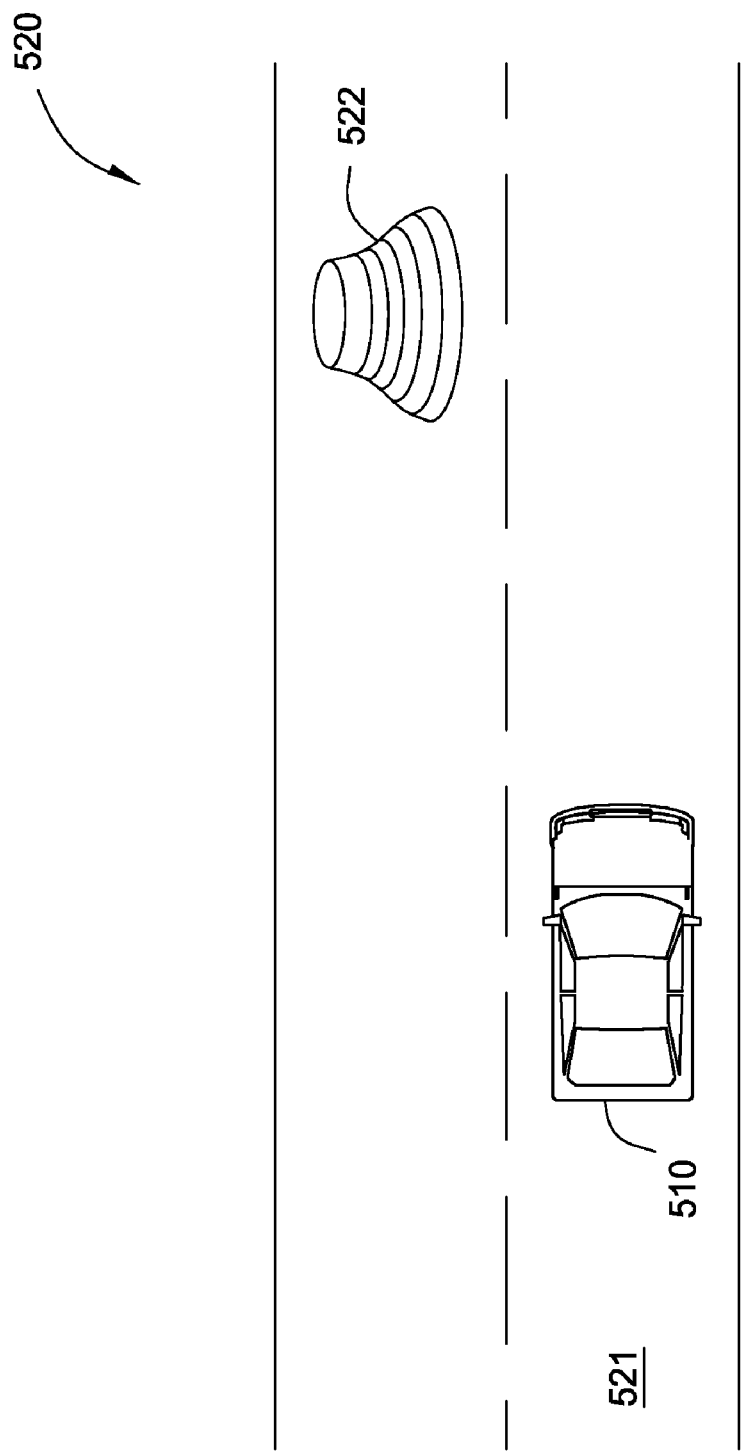

Thus, upon seeing the traffic cone in his lane, the player may exercise the power play option, thereby resulting in the obstacle disappearing, or otherwise being removed from the lane 521. FIG. 5B illustrates the predefined path after the player has exercised the power play option. As can be seen in the FIG. 5B, the traffic cone 522 is no longer present in the lane 521, thereby allowing the player to continue moving his/her vehicle in a relatively straight direction at a high rate of speed. Specifically, in FIG. 5B, upon exercising the power play option, the obstacle 522 is moved from the lane 521 to the lane 522.

Figure 6A:
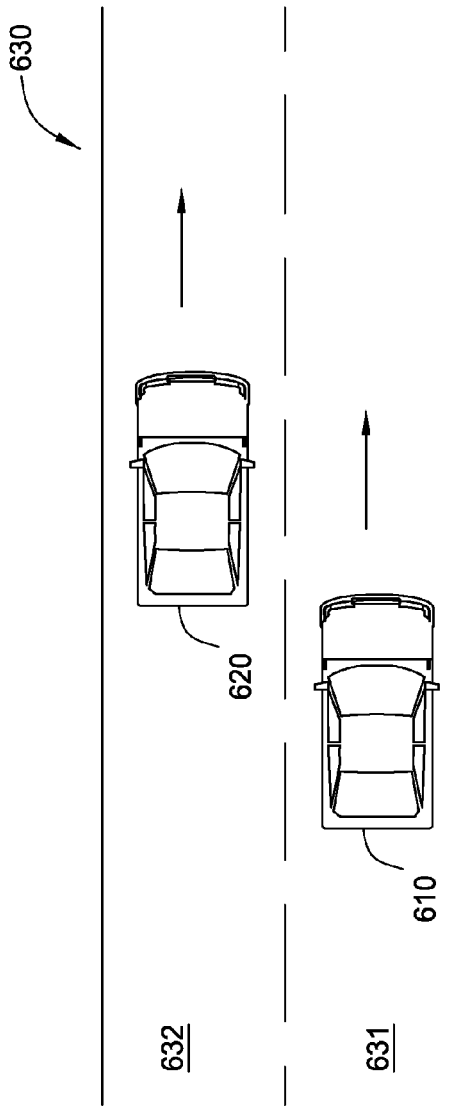
FIGS. 6A-B illustrate another power play according to an embodiment of the invention.
Figure 6B:
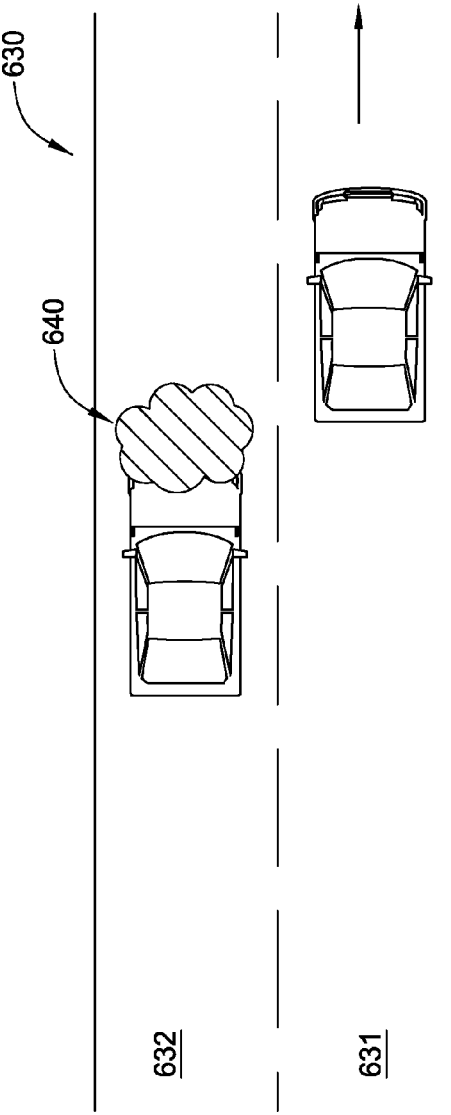

In one embodiment, exercising the power play option may result in one or more obstacles being created in one or more opponents' path. For example, FIG. 6A illustrates a player's vehicle 610 and an opponent's vehicle 620 travelling along a path 630. Specifically, the player's vehicle 610 is shown travelling in a lane 631 and the opponent's vehicle 620 is shown moving in a lane 632 of the path 630. As can be seen in FIG. 6A, the opponent's vehicle 620 is ahead of the player's vehicle. Accordingly, to gain an advantage in the race, the player may exercise a power play option that dynamically creates an obstacle in front of the opponent's vehicle 620. For example, as illustrated in FIG. 6B, exercising the power play may create a pot hole 640 in front of the opponent's vehicle 620. Because the obstacle may be created dynamically and suddenly, the opponent may not have sufficient time to maneuver around the obstacle, thereby causing the opponent's vehicle to crash or at least significantly slow down. By creating such obstacles dynamically in an opponent's path, the player may be able to gain an advantage in the race by using power plays, as illustrated in FIG. 5B.

In one embodiment of the invention, several different levels of power plays may be progressively attained by a player during the race. At each progressive level, the effects of the exercising the power play and the advantage to the player may become greater. For example, in one embodiment, three power play levels, e.g., level 1, level 2 and level 3 may be achieved by a player. At the start of the game, the player may accumulate points to attain the level 1 power play. In one embodiment, level 1 power plays may generally slow down a competitor's vehicle. For example, the player may exercise the level 1 power play to create pot holes of bumps in front of an opponent's vehicle to slow the opponent's vehicle.

After achieving the level 1 power play, the player may continue to accumulate points to achieve a level 2 power play. In one embodiment, level 2 power plays may generally cause an opponent's vehicle to crash, thereby stopping the opponent's vehicle. For example, by exercising a level 2 power play, the player may create obstacles such as traffic drums in front of an opponent's vehicle, thereby causing the opponent to crash.

After achieving the level 2 power play, the player may continue to accumulate points to achieve a level 3 power play. In one embodiment, level 3 power plays may generally cause an opponent's vehicle to stop for a predefined period of time. For example, by exercising a level 3 power play, the player may cause rail road crossing gates in an opponent's path to close for a train to pass, thereby requiring the opponent's vehicle to stop until the train passes. In one embodiment, at each power play level, the power plays from lower level may also be available to the player. In other words, the power plays earned may be cumulative. For example, after achieving level 3 power plays, the player may be able to exercise any one of level 1, level 2, and level 3 power plays. Alternatively, at any given power play level, only the power plays associated with that level may be available to the player. While three power play levels are described hereinabove, in alternative embodiments, any number of power play levels may be implemented.

In one embodiment, a given power play may be exercised only once by the player during the game. Alternatively, in some embodiments, once a particular power play is exercised, the player may have to wait for a predefined period of time before exercising the same power play again. In other embodiments, once a power play is exercised, the player may have to earn the power play again, e.g., by accumulating points, to become eligible for the power play again.

Embodiments of the invention are not limited to the specific power plays described for exemplary purposes herein. In general, any power play that modifies the predefined path of the race falls within the purview of the invention. Modifying the predefined path may include moving, removing or creating obstacles in the path. Other examples of modifying the predefined path include blowing up bridges to block lanes of an underlying road, crashing airplanes into one or more lanes of the predefined path, creating construction lanes in the path, stalling vehicles in the path, and the like. Modifying the path may also include removing or moving any one of the above mentioned obstacles.

In some embodiments, modifying the path may include revealing hidden shortcuts of the predefined path. For example, referring back to FIG. 2, a shortcut 260 is disclosed. In some embodiments, exercising a power play may reveal the shortcut only to the player exercising the power play. Therefore, the player may gain an advantage by travelling a shorter distance to reach the finish as compared to other players.

Figure 7A:
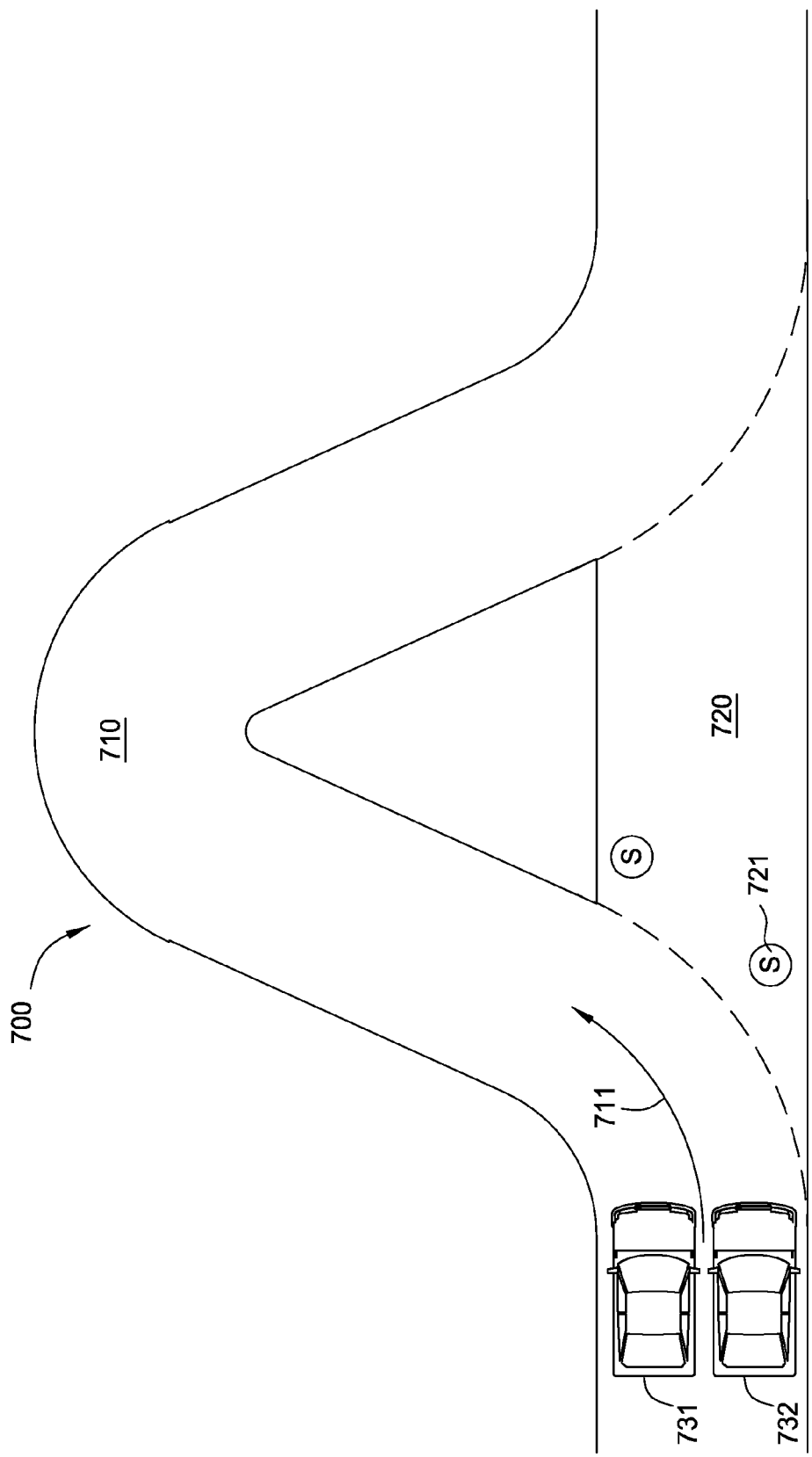
FIG. 7A illustrates an exemplary shortcut according to an embodiment of the invention.

FIG. 7A illustrates another example of a short cut, according to an embodiment of the invention. As illustrated a player vehicle 732 and a competitor vehicle 731 may be travelling along a path 700, which may include a portion 710 and a shortcut 720. The shortcut may be hidden from the vehicles 731 and 732. Now suppose the player vehicle 732 has a power play option available for revealing shortcuts. In one embodiment, as the player vehicle 732 approaches the curve 711, one or more visual indications of an available shortcut may be presented on the player's display screen. For example, one or more icons 721 may be displayed to indicate the location of a short cut.

In response to seeing an available shortcut, the player may exercise the power play option to reveal the shortcut 720 in the path 700. In one embodiment, the shortcut 720 may be visible only on a screen or a portion of a screen associated with the player controlling the vehicle 732. Accordingly, only the vehicle 732 will be allowed to travel via the shortcut 720. Alternatively, the shortcut 720 may be made visible to all the players of the game. Accordingly, in one embodiment, the player controller vehicle 732 may slow his/her vehicle and allow the competitor vehicle 731 to enter the portion 710 of path 700 before exercising the power play and revealing the shortcut 720.

In some embodiments, the racing game may be configured to dynamically create shortcuts in the predefined path of a racing game. For example, when a player becomes eligible for exercising a power play for a shortcut, the player may be allowed to exercise the power play at any time, and at any location along the predefined path. In such embodiments, the racing game may be configured to dynamically generate an appropriate short cut in the path to give the player an advantage over competitors.

While shortcuts that shorten the distance of the predefined path are described hereinabove, in alternative embodiments, the predefined path may be altered in any reasonable manner to give the player an advantage or his/her competitors a disadvantage. For example, in some embodiments, exercising a power play may reveal a new path or alternative path which may have more favorable driving conditions, e.g., fewer obstacles, straight roads, and the like.

Figure 7B:
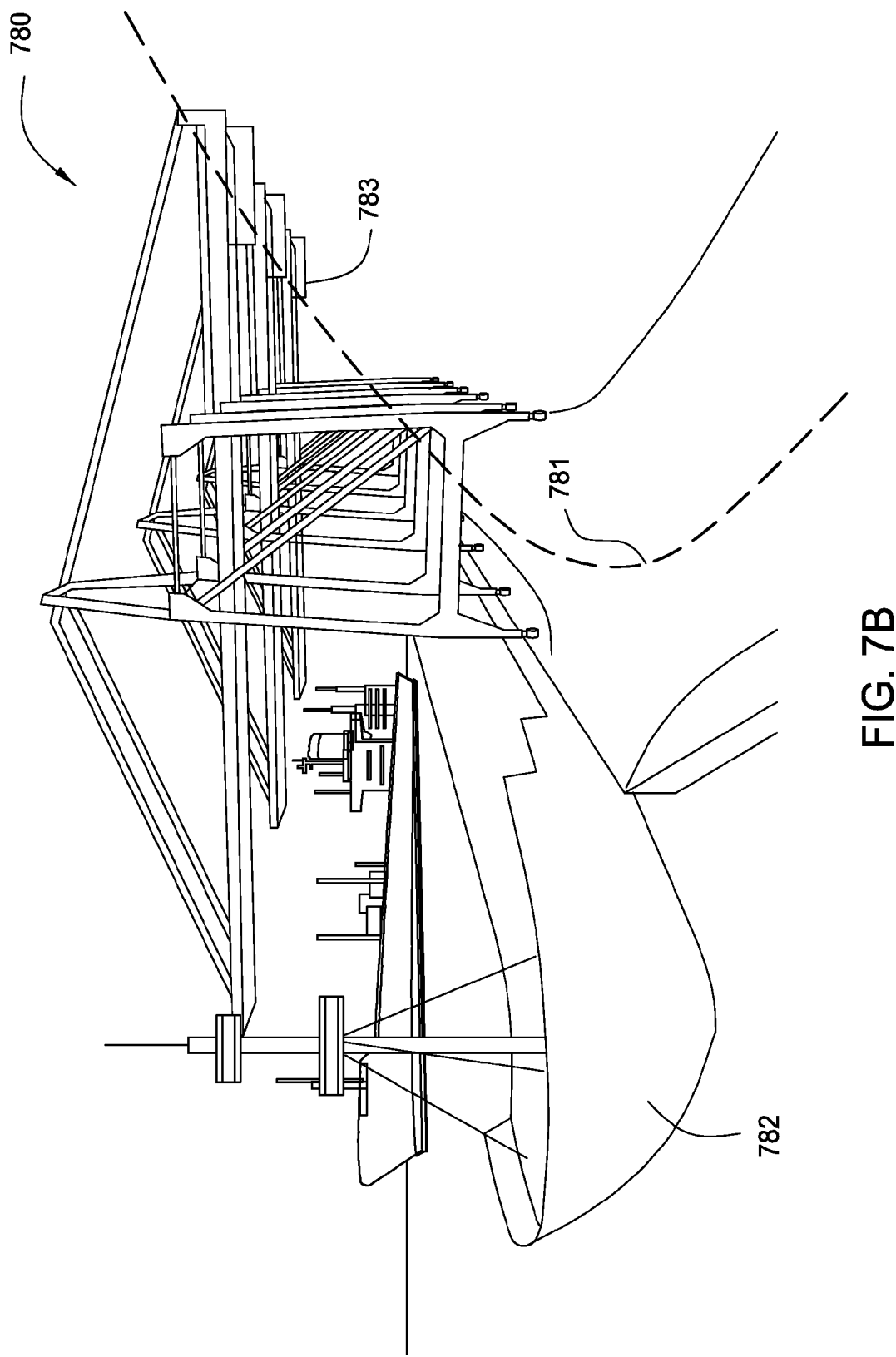
FIG. 7B illustrates another predefined race path according to an embodiment of the invention.

In some embodiments, modifying the predefined path may involve destroying at least a portion of an existing path and creating a new path around the destroyed portion of the existing path. The new path may be selected from one or more alternative, selectable path segments. The alternative path segments may be mutually exclusive, so that only one of the path segments is actually traversable. For example, FIG. 7B illustrates a predefined path 790 comprising a fork region 791 that branches into two or more path segments (three path segments 792, 793, and 794 shown in this example). By default, one of the path segments is active—that is, one of the path segments is currently available to be traversed by the players and defines a portion of the complete path of the racing game. Upon approaching the fork region 791, a player may alter the path of the racing game by exercising a power play to select one of the other path segments as the segment to be traversed by one or more of the players of the game. For example, assume that segment 794 is the default traversable segment. By exercising a power play as the player approaches the fork region 791, segment 794 becomes unavailable (e.g., obstructed) and one of the other two segments 792 or 793 become available/traversable.

In an alternative embodiment, all of the alternative path segments (e.g., the path segments 792, 793, and 794 of FIG. 7B) may be available/traversable by default. In this case, exercising the power play results in one or more of the other segments being blocked, leaving less than all of the alternative path segments available. For example, if a player selects segment 794 by exercising a power play, segments 792 and 793 may be blocked, thereby requiring all players to travel the segment 794. In some embodiments, players of the game may be required to travel the selected segment until the end of the power play, until another power play selecting a different segment, or like event occurs.

Figure 7C:
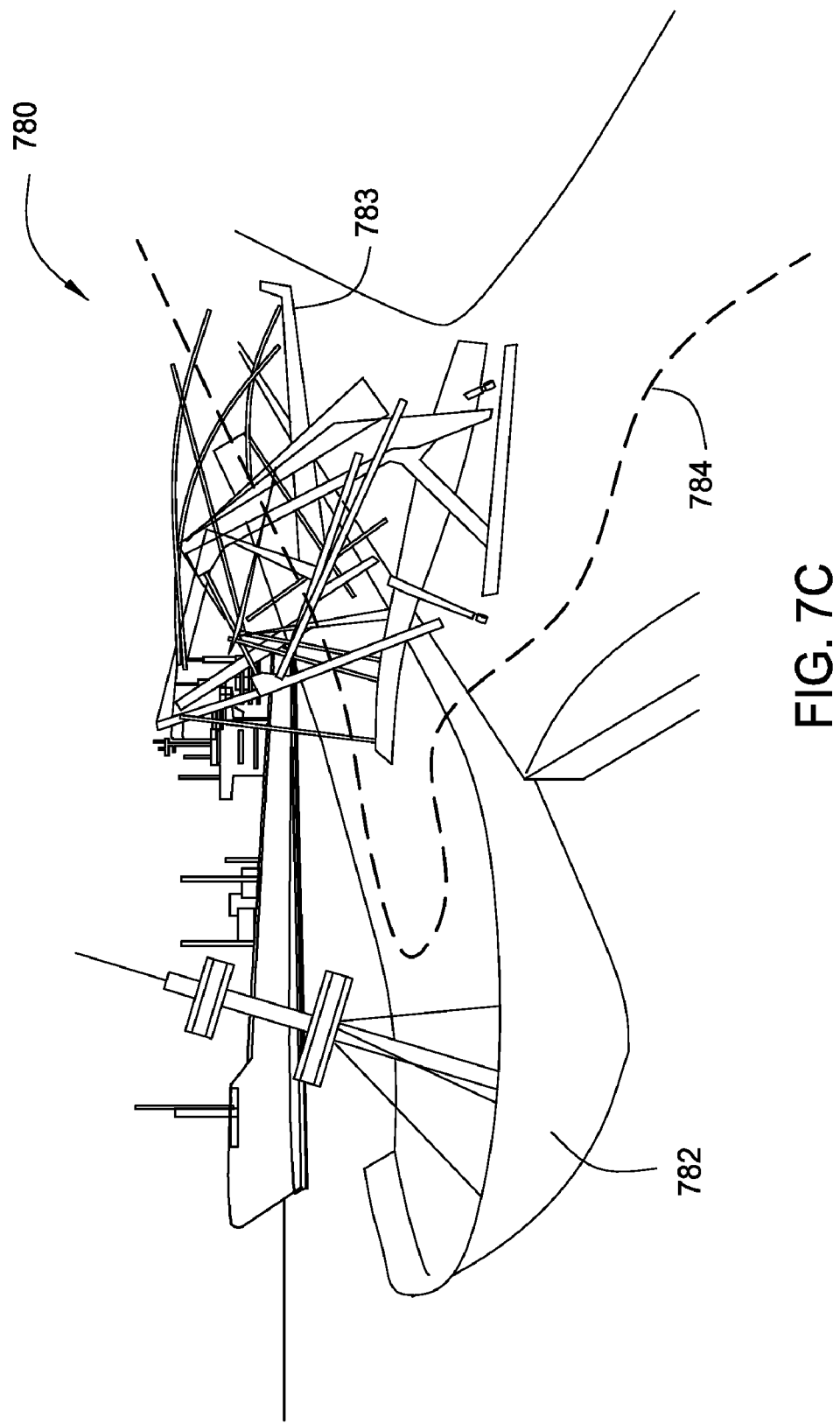
FIGS. 7C and 7D illustrate modification of a predefined race path according to an embodiment of the invention.
Figure 7D:
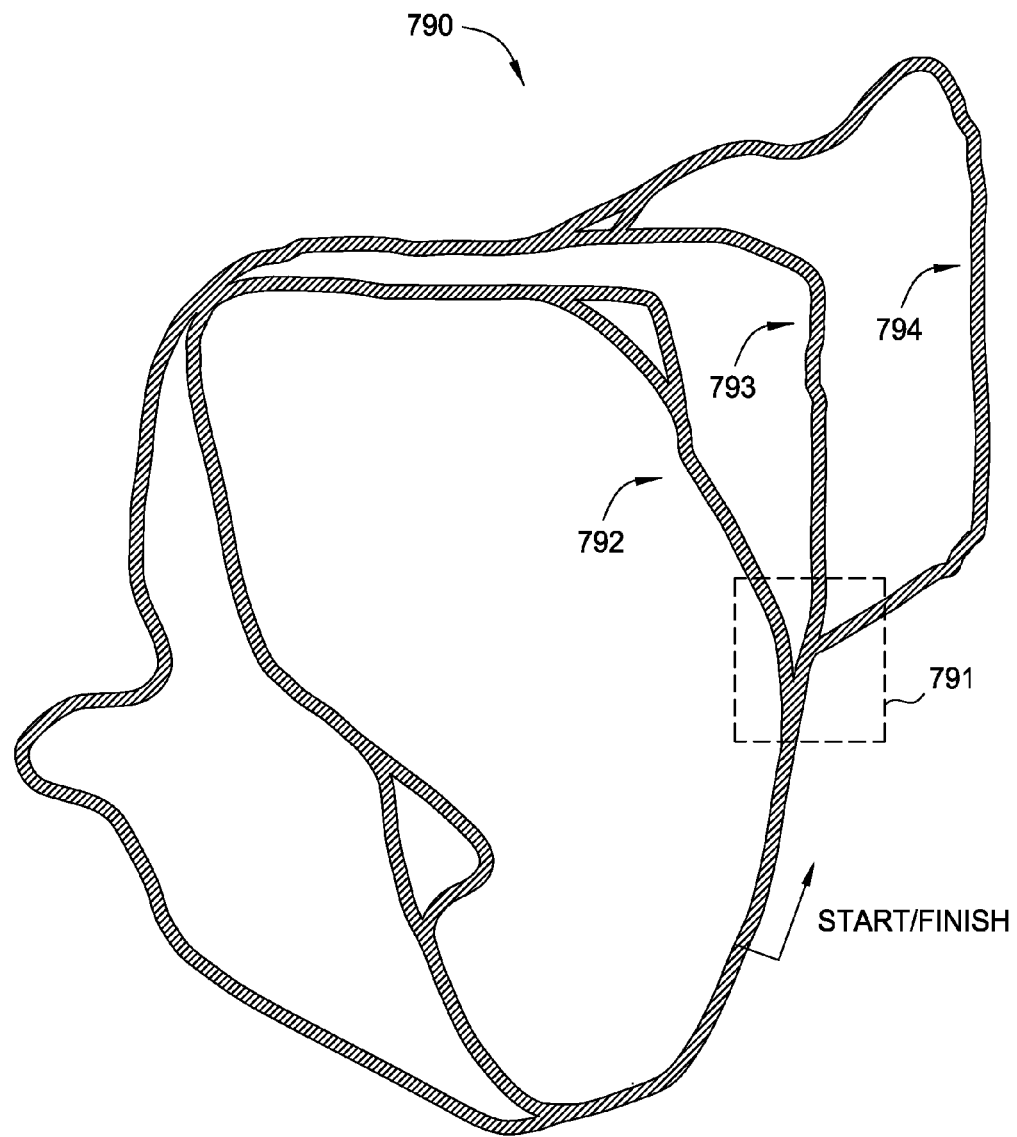

The visual dynamic a player experiences when a power play is exercised may vary according to different embodiments. FIGS. 7C and 7D illustrate an exemplary scene 780 of a racing game, according to an embodiment of the invention in which exercising the power play closes one path segment and opens an alternative path segment. As illustrated in the scene 780 of FIG. 7C, a first path 781 (which may correspond to one of the path segments 792, 793, and 794 shown in FIG. 7B) may pass near a ship 782 and under a gantry 783. In one embodiment, a player may exercise a power play which may cause the gantry 783 to blow up and block the first path 781. For example, in one embodiment, upon approaching the gantry 783, a user may be provided a visual indication, e.g., an icon, a message, an arrow, or the like indicating that a power play option may be exercised to blow up the gantry. Accordingly, the user may exercise the power play option to gain an advantage in the game.

FIG. 7D illustrates the scene after the gantry 783 has been blown up. As a result of the gantry 783 blowing up and collapsing, a second path 784 (which may correspond to one of the other path segments 792, 793, and 794 shown in FIG. 7B) may be created. As illustrated in FIG. 7D, the second path 784 may pass through the ship 782 and around the collapsed gantry 783.

Exercising the power play option may involve pressing one or more functional buttons, e.g., the functional buttons 314 and 324 illustrated in FIGS. 3A and 3B, on the player's controller. Any combination of one or more of the functional buttons may be used to exercise the power play. In some embodiments, a different functional button, or combination of functional buttons, may be pressed to exercise different power plays. For example, the functional button A in FIG. 3A may be used to create a pot hole in an opponent's lane, whereas the functional button B may be pressed to remove a pot hole from the player's lane.

While using functional buttons to exercise the power play option is disclosed herein, in alternative embodiments, any one of the controller buttons or other input devices may be used to exercise the power play. For example, in some embodiments, power plays may be exercised by using one or more of a joystick, direction pad, start button, hand gestures, and the like.

In some embodiments, one or more rules may be defined for exercising power plays. For example, in a particular embodiment, a power play that dynamically creates an obstacle in an opponent's path may only be created in front of an opponent vehicle that is ahead of the player's vehicle. In alternative embodiments, the player may have the option to create obstacles in portions of the path he has already traversed to slow down opponents that may be catching up to the player.

Figure 8:
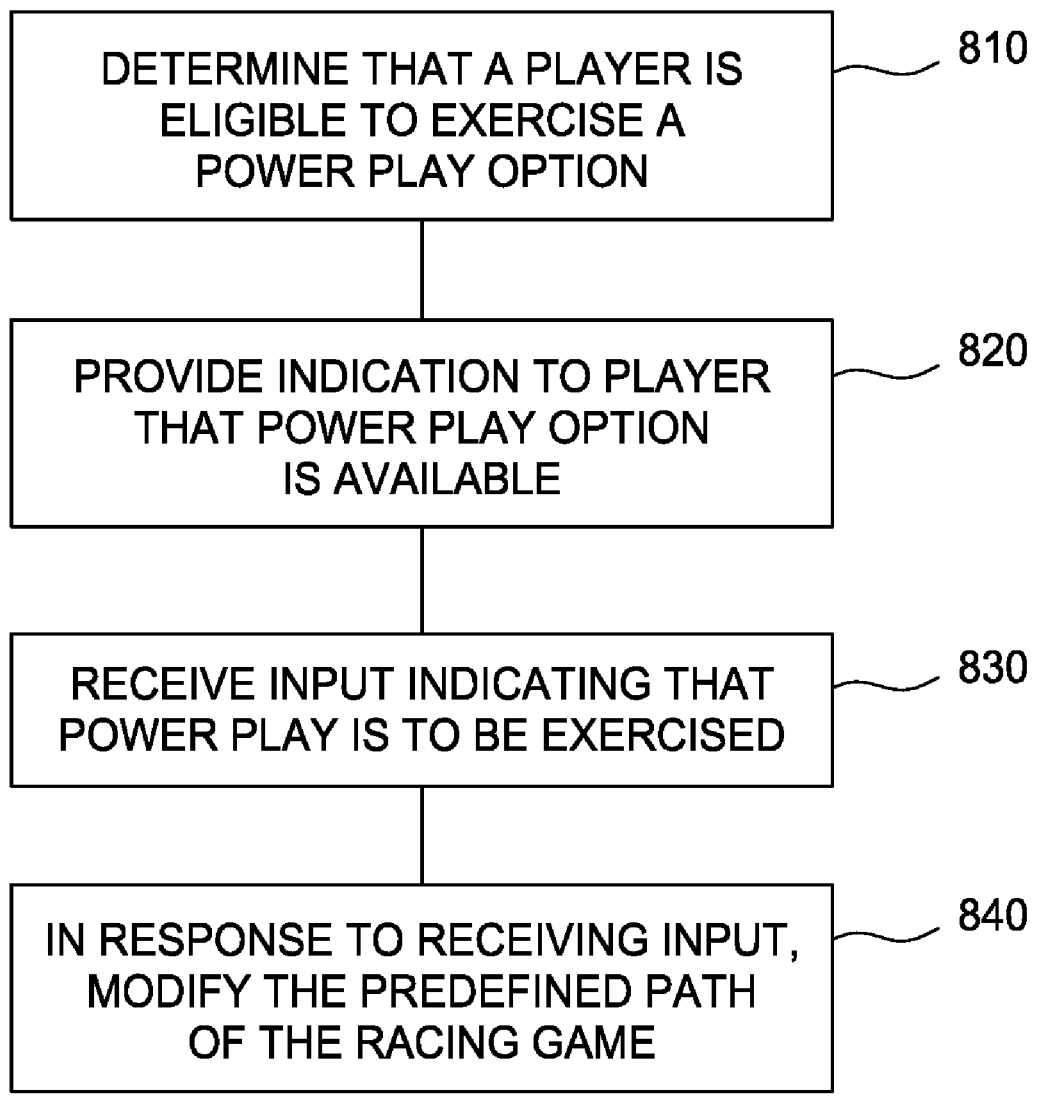
FIG. 8 is a flow diagram illustrating exemplary operations performed by a gaming program, according to an embodiment of the invention.

FIG. 8 is a flow diagram of exemplary operations that may be performed by a gaming program, according to an embodiment of the invention. The operations may begin in step 810 by determining that a player is eligible to exercise a power play option. The eligibility may be determined, for example, based on skills points accumulated by the player. In step 820, an indication may be provided to the player that a power play option is available. For example, the gaming program may indicate that the power play is available by means of a power play bar, an icon, a message, or any other graphical indication on a display screen. In step 830, the gaming program may receive an input indicating that the power play is to be exercised. For example, the gaming program may receive input from a controller, the input comprising one or more button presses. In response to receiving the input, the gaming program may execute the power play by, e.g., modifying the predefined path of the racing game in step 740.

While the foregoing is directed to embodiments of the present invention, other and further embodiments of the invention may be devised without departing from the basic scope thereof, and the scope thereof is determined by the claims that follow.

What is claimed is:

1. A computer implemented method for executing a vehicle racing video game, comprising:
    during a race, generating an indication to a player participating in the race that a game play option earned by the player through a game play performance of the player and is available during the race, the game play option being selectable by the player to cause a modification in a predefined path traversable by vehicles participating in the race, the modification being selected from at least one of:
        a permanent structural change to the predefined path; and
        a route change to the predefined path that alters where at least one of the vehicles is able to traverse;
    receiving user input from the player indicating that the game play option is to be exercised during the race; and
    in response to receiving the user input, modifying the predefined path of the race,
    wherein generating the indication comprises prompting the player with a visual cue of the game play option once the player reaches a predefined location on the predefined path; wherein the visual cue references a structure on which the modification will be effected.

2. The method of claim 1, wherein the indication that the game play option is available is generated upon determining that the player has earned the game play option.

3. The method of claim 2, wherein the player earns the game play option by accumulating points, wherein the points are accumulated based on the player's driving skills.

4. The method of claim 1, wherein at a time prior to receiving the user input, the predefined path includes a first path segment traversable by the vehicles, and wherein the modification of the predefined path comprises making the first path segment untraversable by the vehicles and making a second path segment traversable by the vehicles.

5. The method of claim 1, wherein the modification of the predefined path comprises one of:
    (i) removing an obstacle from a portion of the path being traversed by the vehicle of the player; and
    (ii) dynamically creating an obstacle in a portion of the path being traversed by one or more vehicles of the opponents of the player.

6. The method of claim 1, wherein the modification of the predefined path comprises revealing a hidden short cut in the path to the player.

7. The method of claim 1, wherein modifying the predefined path of the race in response to exercising the game play option comprises executing a pre-scripted scene.

8. A computer readable storage medium comprising a program product which, when executed, is configured to perform an operation to execute a vehicle racing video game, comprising:
    during a race, generating an indication to a player participating in the race that a game play option earned by the player through a game play performance of the player and is available during the race, the game play option being selectable by the player to cause a modification in a predefined path traversable by vehicles participating in the race, the modification being selected from at least one of:
        a permanent structural change to the predefined path; and
        a route change to the predefined path that alters where at least one of the vehicles is able to traverse;
    receiving user input indicating that the game play option is to be exercised; and
    in response to receiving the user input, modifying the predefined path of the race,
    wherein generating the indication comprises prompting the player with a visual cue of the game play option once the player reaches a predefined location on the predefined path; wherein the visual cue references a structure on which the modification will be effected.

9. The computer readable storage medium of claim 8, wherein the indication that the game play option is available is generated upon determining that the player has earned the game play option, wherein the player earns the game play option by accumulating points, wherein the points are accumulated based on the player's driving skills.

10. The computer readable storage medium of claim 8, wherein at a time prior to receiving the user input, the predefined path includes a first path segment traversable by the vehicles, and wherein modifying the predefined path comprises making the first path segment untraversable by the vehicles and making a second path segment traversable by the vehicles.

11. The computer readable storage medium of claim 8, wherein modifying the predefined path comprises one of:
    (i) removing an obstacle from a portion of the path being traversed by the vehicle of the player; and
    (ii) dynamically creating an obstacle in a portion of the path being traversed by one or more vehicles of the opponents of the player.

12. The computer readable storage medium of claim 8, wherein modifying the predefined path comprises dynamically creating an obstacle in a portion of the path being traversed by one or more vehicles of the opponents of the player.

13. The computer readable storage medium of claim 8, wherein modifying the predefined path comprises revealing a hidden short cut in the path to the player.

14. The computer readable storage medium of claim 8, wherein modifying the predefined path of the race in response to exercising the game play option comprises executing a pre-scripted scene.

15. A system, comprising:
    a memory device comprising a vehicle racing video game; and
    a processor which, when executing the vehicle racing video game is configured to:
        during a race, generate an indication to a player participating in the race that a game play option earned by the player through a game play performance of the player and is available during the race, the game play option being selectable by the player to cause a modification in a predefined path traversable by vehicles participating in the race, the modification being selected from at least one of:
            a permanent structural change to the predefined path; and
            a route change to the predefined path that alters where at least one of the vehicles is able to traverse;
        receive an input from the player indicating that the game play option is to be exercised during the race; and in response to receiving the user input, modify the predefined path of the race, wherein generating the indication comprises prompting the player with a visual cue of the game play option once the player reaches a predefined location on the predefined path; wherein the visual cue references a structure on which the modification will be effected.

16. The system of claim 15, wherein the indication that the game play option is available is generated by the processor upon determining that the player has earned the game play option, wherein the player earns the game play option by accumulating points, wherein the points are accumulated based on the player's driving skills.

17. The system of claim 15, wherein at a time prior to receiving the user input, the predefined path includes a first path segment traversable by the vehicles, and wherein the processor is configured to cause the modification of the predefined path by making the first path segment untraversable by the vehicles and making a second path segment traversable by the vehicles.

18. The system of claim 15, wherein the processor is configured to cause the modification of the predefined path by one of:
  (i) removing an obstacle from a portion of the path being traversed by the vehicle of the player; and
  (ii) dynamically creating an obstacle in a portion of the path being traversed by one or more vehicles of the opponents of the player.

19. The system of claim 15, wherein the processor is configured to cause the modification of the predefined path by revealing a hidden short cut in the path to the player.

20. The system of claim 15, wherein modifying the predefined path of the race in response to exercising the game play option comprises executing a pre-scripted scene.

* * * * *